United States Patent [19]

Anderson

[11] 4,282,834

[45] Aug. 11, 1981

[54] BOILER STRUCTURE EMBODYING A PLURALITY OF HEAT EXCHANGE UNITS

[75] Inventor: J. Hilbert Anderson, York, Pa.

[73] Assignee: Sea Solar Power, York, Pa.

[21] Appl. No.: 59,031

[22] Filed: Jul. 19, 1979

[51] Int. Cl.³ .............................. F28F 1/00; F28F 3/10
[52] U.S. Cl. ............................... 122/367 C; 122/260;
165/166; 165/40
[58] Field of Search ........... 122/367 R, 367 A, 367 C, 122/209 R, 232, 260, 262–264; 165/40, 170, 173, 166, 76, 82

[56] References Cited

U.S. PATENT DOCUMENTS

| | | | |
|---|---|---|---|
| 1,816,757 | 7/1931 | White | 122/260 |
| 1,932,712 | 10/1933 | Skinner | 122/260 |
| 2,875,986 | 3/1959 | Holm | 165/166 |
| 2,986,454 | 5/1961 | Jewett | 165/173 |
| 3,542,124 | 11/1970 | Manfredo | 165/166 |
| 4,139,054 | 2/1979 | Anderson | 165/166 |
| 4,159,735 | 7/1979 | Anderson | 165/40 |

*Primary Examiner*—Henry C. Yuen
*Attorney, Agent, or Firm*—Kemon & Estabrook

[57] ABSTRACT

An assembly of a plurality of heat exchange units arranged in stacked formation in separate banks with a plurality of vapor and liquid manifold elements interposed between said banks and connected thereto by suitable conduits. The various layers of each stacked bank includes a plurality of heat exchange units arranged in a common horizontal plane with the manifold elements connected to each unit.

7 Claims, 9 Drawing Figures

BOILER STRUCTURE EMBODYING A PLURALITY OF HEAT EXCHANGE UNITS

BACKGROUND OF THE INVENTION

The present invention is directed to heat exchangers of the type utilizing a liquid and a vapor in order to effect the transfer of heat.

When a heat exchanger is employed as a boiler or an evaporator, it is important to keep all surfaces wetted so that a maximum heat transfer effect occurs between the wetted surfaces and the liquid in order to create bubbles or boiling by the vapor action. As is well known in the field of refrigeration, when an evaporator is covered or filled with a liquid which is boiled by having heat applied to it through the heat exchanger surfaces, then the liquid itself has much higher density, usually, than the vapor which is created by boiling. Certain aspects of the foregoing are set forth in Applicant's prior U.S. Pat. Nos. 3,312,054 dated Apr. 4, 1967; 4,139,054 dated Feb. 13, 1979 and 4,159,735 dated July 3, 1979.

SUMMARY OF THE INVENTION

The present invention is directed to a boiler structure or apparatus embodying a plurality of boilers consisting of a plurality of heat exchanger units in a horizontal bank which are assembled or arranged in stack or tier formation.

A boiler may very readily embrace the concept of a series of heat exchange units arranged in a horizontal plane on a base element in spaced relation to one another. Each heat exchange unit may then have positioned thereon in a stack or tier formation a plurality of heat exchange units arranged in banks. A vapor exhaust manifold is provided for each heat exchange unit of each tier and a liquid inlet manifold is also provided for each heat exchange unit of each tier.

Furthermore, the plate members that define the gas or vapor passageways in each heat exchange unit are provided with screen members and a fin plate interposed therebetween to break up condensate streams flowing through said passageways. Such an arrangement tends to promote high boiling activity at very low temperature differences resulting in extremely high boiling heat transfer rates.

DESCRIPTION OF THE PREFERRED EMBODIMENT

Figure 2:
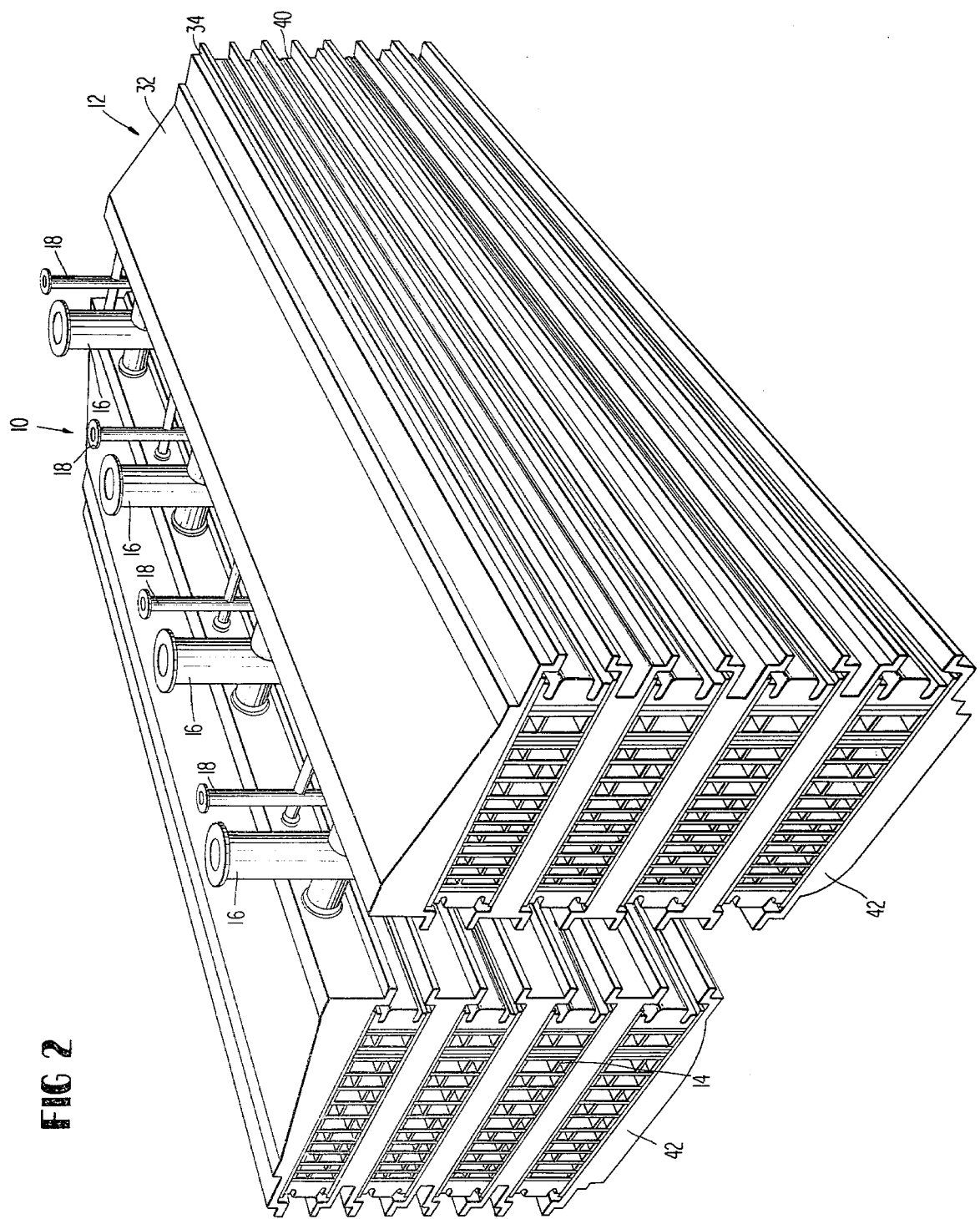
FIG. 2 is a perspective view of a pair of boilers embodying a plurality of banks of heat exchange units with associated vapor and liquid manifolds.

There is shown in FIG. 2 a pair of boilers 10 and 12 each of which consists of a bank of four heat exchange units 14 that are arranged in a horizontal plane. Each layer or bank of units are arranged in a superimposed relation in a tier or stack formation. The various heat exchange units 14 are connected to centrally disposed vapor discharge manifolds 16 and liquid inlet manifolds 18 that are interposed between the boilers 10 and 12.

Figure 1:
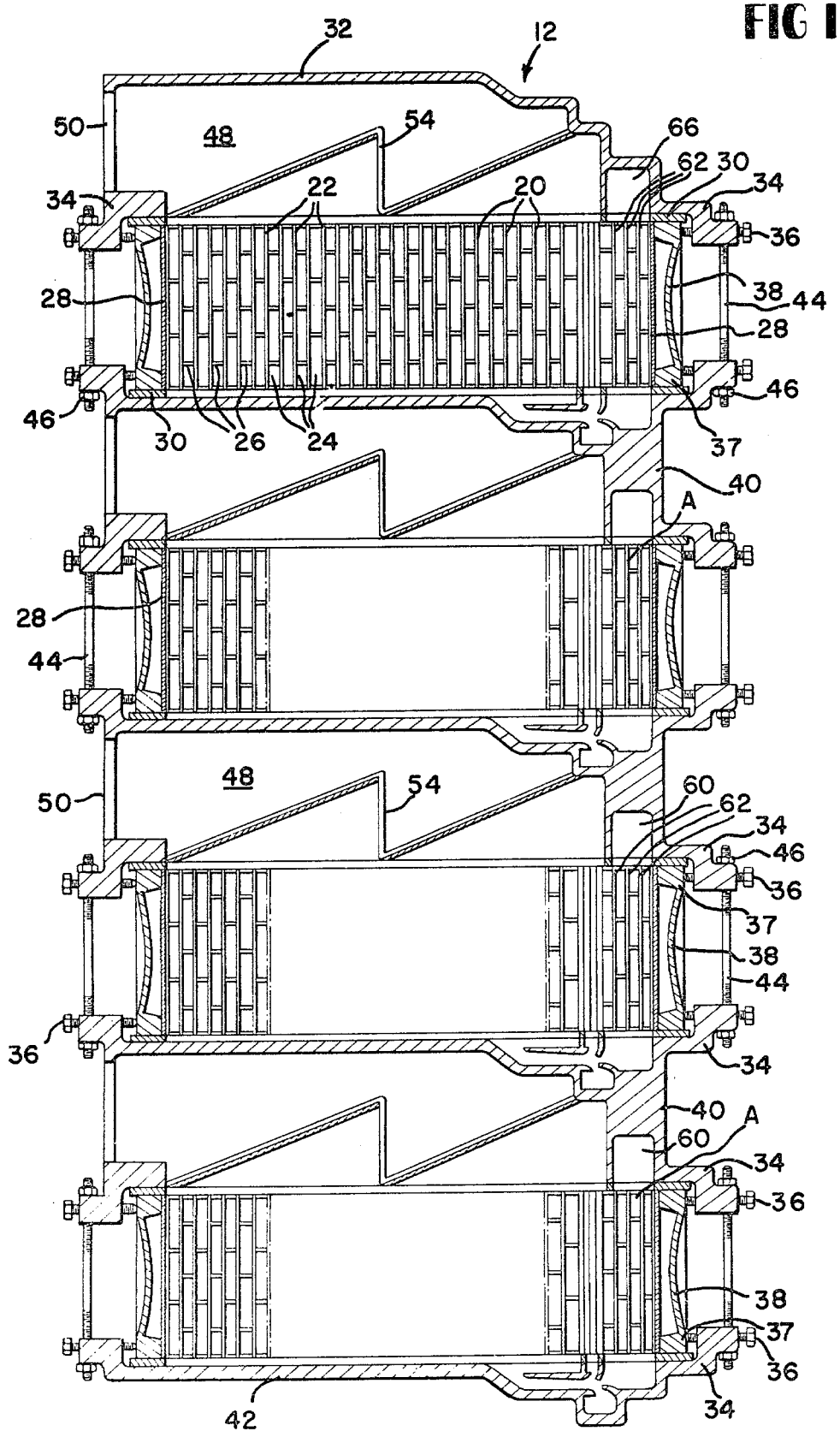
FIG. 1 is a vertical sectional view of a bank of heat exchange units.

The heat exchange units 14 for each tier of the boilers 10 and 12 are shown in FIG. 1 and consist of a plurality of plate members 20 that are assembled in a stack. The plate members 20 are arranged in pairs so as to define between adjacent pairs vapor passageways 22 with water passages 24 provided between the plates of each pair. The passages 24 as defined by the plate members 20 have a plurality of separators 26 arranged therein. The plate members 20 are assembled in a stack form between pressure plates 28, the ends of which have gasket flanges 30 positioned thereon and against the edges of the plate members 20. The surfaces of the gasket flanges which engage or abut the edges of the plate members 20 are provided with grooves, not shown, for effectively sealing the edges of said plate members to said gaskets.

The plate members 20 in conjunction with the pressure plates 28 constitute a heat exchanger and, as illustrated in FIG. 1, a boiler 10 or 12 may consist of four heat exchangers stacked on top of each other and separated by intermediate cover members. There is shown in FIG. 2, by way of illustration, the boilers 10 and 12 which consist of four assemblies of heat exchangers with each heat exchanger being connected to a vapor exhaust manifold 16 and a liquid inlet manifold 18.

Figure 3:
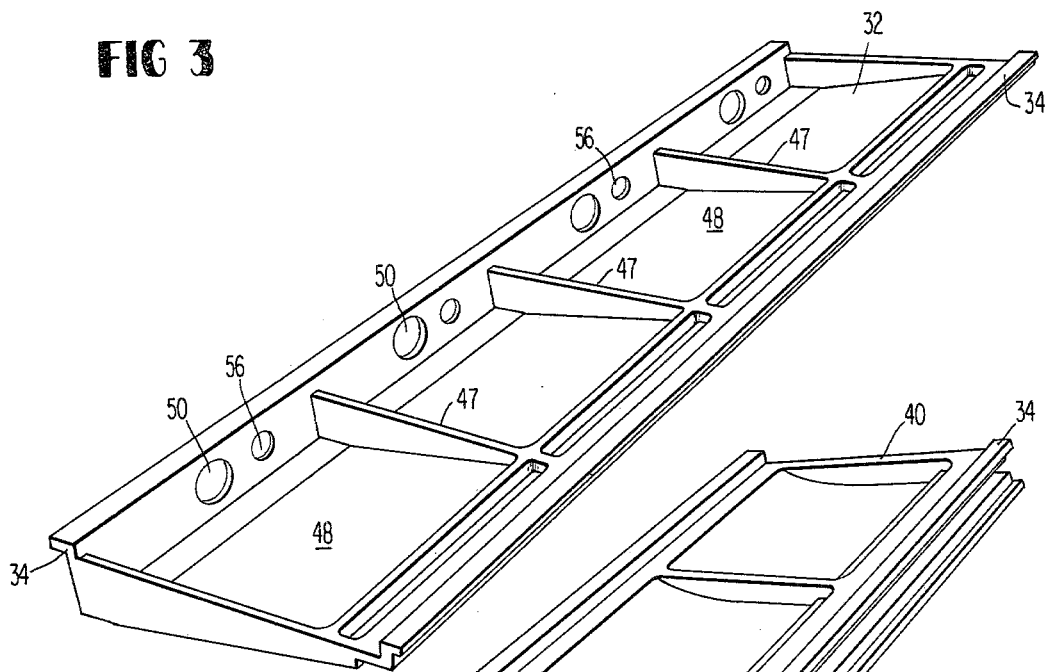
FIG. 3 is a perspective view of the top casting or cover for the heat exchange units of the several banks, with said cover being shown in an inverted position.
Figure 4:
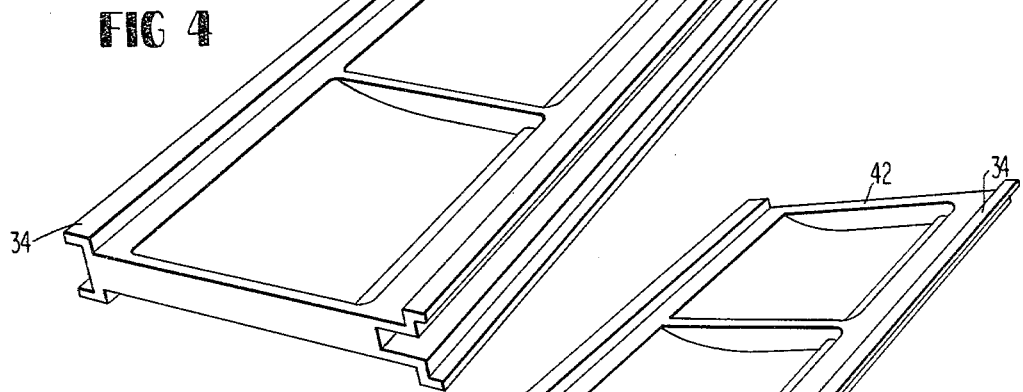
FIG. 4 is a perspective view of a center casting for the heat exchange units of the several banks.
Figure 5:
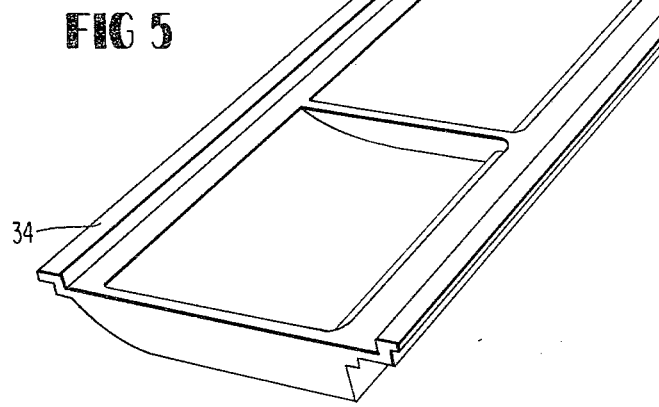
FIG. 5 is a perspective view of the bottom casting for the heat exchange units of the several banks.

As shown in FIGS. 1 and 2 the boilers 10 and 12 are provided with a top cover member 32 which is shown in an inverted position in FIG. 3. The top cover member 32 is formed at each end with an offset projection 34, FIG. 1, that is adapted to receive threaded bolts 36. The bolts 36 engage the enlarged edge portions 37 of the cover member 38 for forcing said cover member against the pressure plates 28 and the stack of plate members 20, thereby compressing the plate members 20 towards one another and holding them in horizontal compression. The various heat exchange units of each stack or assembly are provided with intermediate members 40, FIG. 4, which act as a bottom cover member for one heat exchange unit as well as a top cover member for the subjacent heat exchange unit. A bottom cover member 42, FIG. 5, for the lowermost heat exchange unit of each stack or assembly is provided for the boilers 10 and 12 and said cover member is not connected to the manifolds 16 and 18.

As shown in FIG. 1 the intermediate members 40 as well as the bottom cover member 42 are provided with offset projections 34 which have bolts 36 threaded therethrough that in turn engage the enlarged edge portions 37 of the cover members 38 for forcing same against the pressure plates 28 and the stack of plate members 20 thereby compressing the plate members towards one another. The offset projections 34 are also provided with bolts 44 that have nuts 46 threaded thereon for drawing the top cover member and the intermediate members 40 towards one another as well as drawing the bottom cover member 42 towards the intermediate member 40. Thus, each heat exchange unit of the entire assembly or stack is under horizontal compression through said plate members and pressure plates and end covers due to the tightening of the bolts 36 while at the same time the assembly of each heat exchange unit is under vertical compression by means of the bolts 44 being tightened by the nuts 46 in conjunction with the offset projections 34.

The top cover member 32, FIG. 3, is formed with spaced partitions 47 which define a plurality of compartments 48. It is to be understood that the showing in FIG. 3 is simply by illustration as there could be two or six or more heat exchange units in the bank of units constituting the top tier in the boilers 10 and 12. The compartments 48 receive the vapor flowing from the passageways 22 which vapor is then delivered to the vapor exhaust manifold 16 by way of the opening 50 and one of the conduits 52 connected to said manifold. Each of the vapor sections or compartments 48 is provided with an eliminator screen 54, FIG. 1, which is adapted to catch liquid droplets and drain them back to the top of the stack of plate members 20 rather than allowing said liquid droplets to move through the compartment 48 and out of the vapor outlet opening 50. The top cover member 32 is also provided in each compartment 48 with an aperture 56 to which is connected suitable conduits 58 that are carried by the liquid inlet manifold 18. The apertures 56 are also provided with suitable conduits, not shown, which are in communication with an inlet opening or passage 60 that communicates with channels 62 which are defined by the plate members 20 being arranged into section A.

The intermediate members 40 which constitute the top and bottom cover members for the bank of intermediate heat exchange units of each stack or assembly are provided with suitable vapor outlet openings 50 that are connected to the vapor exhaust manifold 16 as well as apertures 56 that are connected by conduits 58 to the liquid inlet manifold 18. Thus, the intermediate members 40 function as a top cover member and a bottom cover member for a bank of heat exchange units in each stack or assembly and are connected to the several manifolds in the same manner as the top cover member 32.

The bottom cover member 42 is also formed with a plurality of sections or compartments corresponding to those shown in conjunction with the intermediate member 40, but the bottom cover member is not provided with vapor outlets or with suitable apertures for connection to the liquid inlet manifold.

Thus, as shown in FIG. 2, the boilers 10 and 12 each consists of four heat exchange units high and a similar number of heat exchange units in length. Each heat exchange unit is provided with a vapor discharge opening that is in turn connected to a vapor discharge line that terminates in a manifold 16. Thus, the manifold collects the vapor separately from four boiler sections and there are four main vapor discharge lines coming from the boilers 10 and 12 with each separate vapor line taking off vapor at a different section of the boiler and at a different pressure as the vapor pressure developed in the last section is lower than that in the first section.

If one were to arrange the condensers from a turbine exhaust in a sea thermal power plant above the boilers, then it is possible to have the liquid flow from the condensers to the boilers by gravity and through this arrangement there would not be any requirement for a pump. However, the pressure of the liquid entering the boiler is then a function of the height between the condenser and the boiler or evaporator. In FIG. 2 there is shown a stack of evaporators or boilers which is in actual practice about 18 feet high so that the level of the bottom boiler unit is roughly 16 or 18 feet below that of the upper unit. Therefore, the pressure of the liquid flowing in would be much higher to the lower unit than to the upper unit. For this reason, it is advisable to connect the condensers in like fashion above each other as are the boilers and then connect the top condenser to the top evaporator or boiler and the lower condenser to the lower evaporator or boiler so that the liquid head is very closely the same between each set of condensers and evaporators or boilers. This concept or arrangement is set forth in more detail in Applicant's copending application Ser. No. 962,104, filed Nov. 20, 1978, as said application discloses the use of separate liquid pipes coming to the lower boilers than to the upper boilers thereby accomplishing the purpose of having a different set of liquid pipes for the lower boilers than for the upper boilers so that the height of the liquid leg can be fully utilized to force liquid into the boiler at approximately the same pressure in each case. This arrangement results in an overall saving in the required height of liquid to force liquid from the condensers to the boilers or evaporators and thereby improves plant efficiency.

Figure 8:
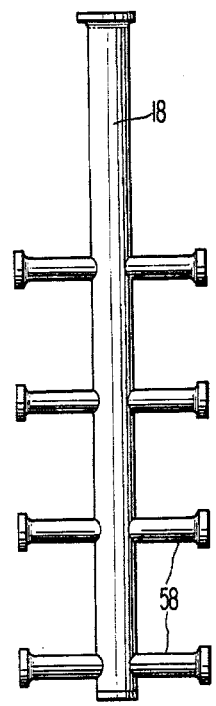
FIG. 8 is an elevational view of a liquid inlet manifold for use in conjunction with a bank of heat exchange units.
Figure 9:
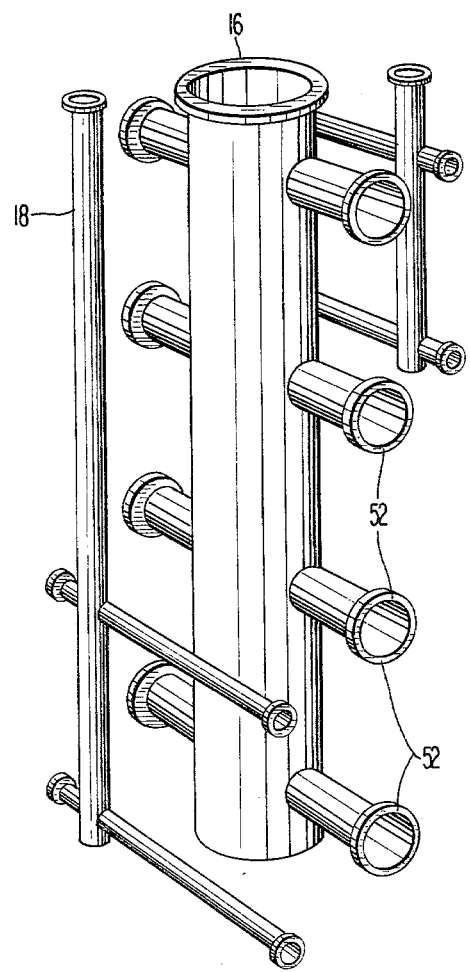
FIG. 9 is an elevational view of a modified manifold layout for use in conjunction with several banks of heat exchange units.

The liquid inlet manifold 18 shown in FIG. 8 is disclosed also in FIG. 2 with respect to the boiler units 10 and 12. In this arrangement the inlet manifold 18 directs liquid to the various units of the boilers by means of the branch conduits 58, and in this manner the height of the liquid leg emanating from the manifold 18 can be fully utilized to force liquid into the various units of the boiler at approximately the same pressure in each instance.

Figure 6:
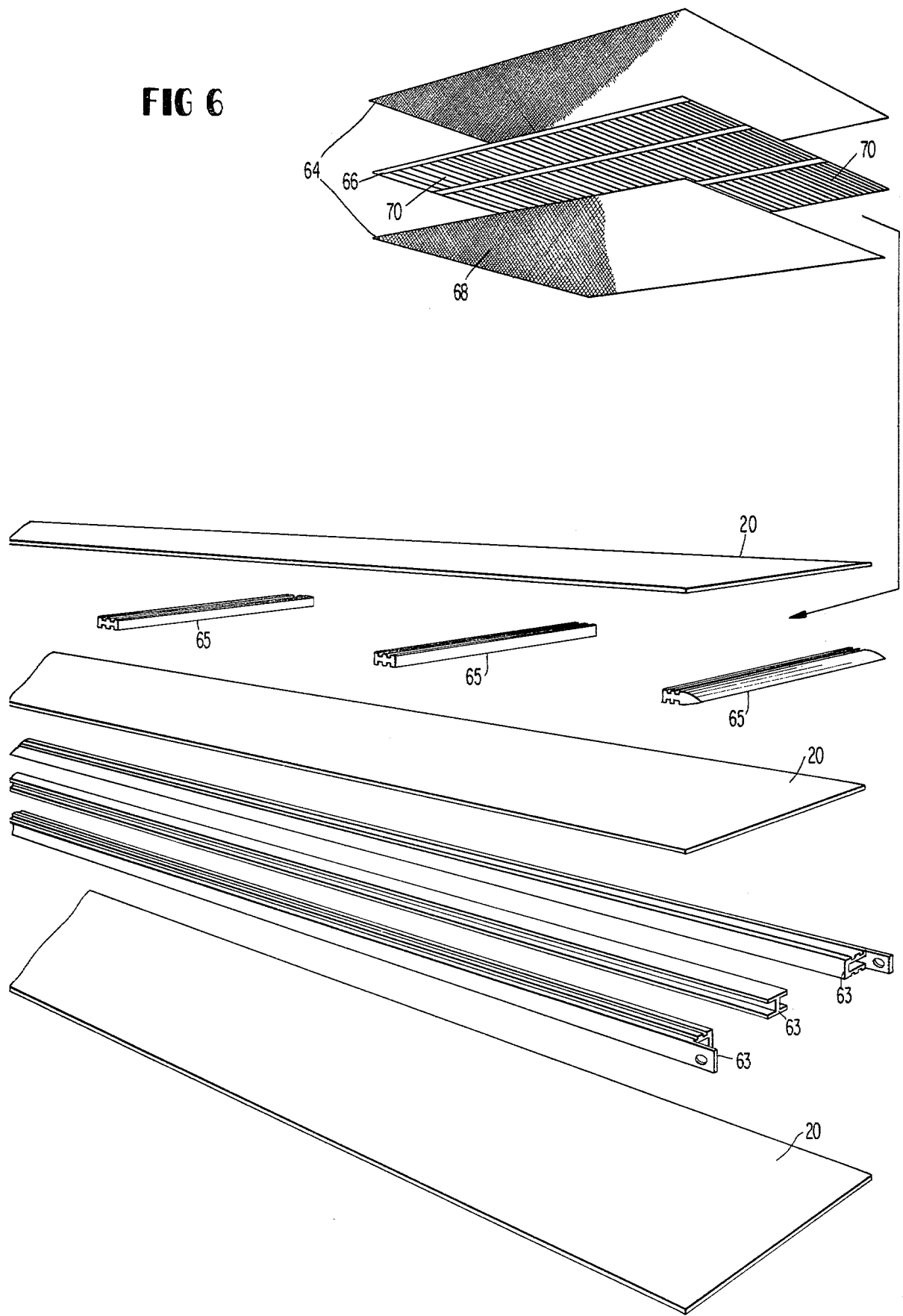
FIG. 6 is an exploded view showing the plate and spacer assemblies for the vapor passageways in a heat exchange unit.
Figure 7:
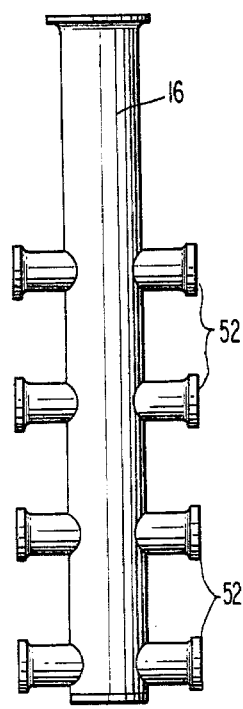
FIG. 7 is an elevational view of a vapor manifold for use in conjunction with a bank of heat exchange units.

There is shown in FIG. 6 an exploded view of the plate assemblies for the vapor passageways 22 as well as the water passages 24. The plate members 20 have interposed therebetween the spacer elements 63 which define the passages for the warm water flowing therethrough. The vapor or working fluid passageways 22 have positioned therein a pair of very fine expanded screen members 64 that have interposed therebetween an expanded fin plate 66. The screen members 64 are pressed tightly against the heat transfer plates 20 by the fin plate 66 positioned between the screen members. The screen members consist in each instance of a very thin sheet of high conductivity material, such as copper or aluminum, with up to thousands of holes 68 per square inch of material. The perforated holes 68 in the screen member 64 are distorted slightly, and thus the holes are in a sense interconnected along the surface of the plate members 20 against which the screen member 64 is pressed.

The foregoing arrangement provides then thousands of very tiny interconnected holes that are well known to promote high boiling activity at very low temperature differences which results in the obtaining of extremely high boiling heat transfer rates with relatively small temperature differences. Inasmuch as the screen members 64 must be pressed tightly against the plate members 20 on both sides, the expanded fin plate 66 is interposed between the screen members so as to act as a separator and a pressure plate to force the expanded screen members 64 tightly against the heat transfer plate members 20. The expanded fin plate 66 can be formed with louvers 70 that are punched out of a single sheet at an angle of approximately 45 degrees, more or less, which then defines a space passage for the liquid to flow upward through the paths created by said louvers and thereby provided multitudinous contacts that squeeze the expanded screen members 64 tightly against the transfer plates 20 while at the same time transmitting heat.

The passageways 22 defined by the plate members 20 are provided with spacer bars 65, FIG. 6, which cooperate with the spaced partitions 47 provided in the top member 32 intermediate members 40 and bottom member 42 in defining the compartments 48. Thus the screen members 64 and expanded fin or louvred plate 66 are positioned between the spacer bars 65 and become aligned with the several compartments 48 while the spacer bars 65 engage the partitions 47 to seal the boiling passageways 22.

The louver or fin plate 66 while disclosed herein in conjunction with a heat exchanger is susceptible of use with a condenser. In this type of arrangement the louvered plate is positioned between flat plates would help to drain liquid away from said flat plates.

Although the foregoing description is necessarily of a detailed character, in order that the invention may be completely set forth, it is to be understood that the specific terminology is not intended to be restrictive to confining, and that various arrangements of parts and modifications of detail may be resorted to without departing from the scope or the spirit of the invention as herein claimed.

I claim:

1. A boiler structure comprising a plurality of heat exchange units arranged as a horizontal bank of units with a plurality of said banks of units arranged in tier formation, each heat exchanger unit having a plurality of plates arranged in pairs in vertical planes and in spaced parallel relation to one another, each pair of plates defining a passageway therebetween and each pair of plates defining a passage between adjacent pairs of plates, a top cover member for each unit with certain of said top cover members constituting bottom cover members for a superjacent unit, said cover members defining compartments with which said passageways communicate, for delivering a vapor thereto, a vapor exhaust manifold, conduits connecting each of said compartments to said manifold, each of said top cover members having an eliminator screen provided therein to remove liquid droplets from the vapor moving through the compartments to the exhaust manifold.

2. A boiler structure as set forth in claim 1 wherein said cover is provided with partitions defining compartments for each unit of a horizontal bank of units.

3. A boiler structure as set forth in claim 1 wherein said plate members defining said passageways have interposed therebetween a pair of fine screen members separated by an expanded fin plate.

4. A boiler structure as set forth in claim 3 wherein said screen members are formed from very thin sheets of high conductivity material whose surfaces are covered with apertures.

5. A boiler structure as set forth in claim 4 wherein the apertures in said sheets are slightly distorted and said apertures are interconnected along the surface of said plate members against which the screen members are pressed.

6. A boiler structure as set forth in claim 5 wherein the slightly distorted apertures intercept the liquid flowing therethrough and promote high boiling activity at low temperature differences to produce high heat transfer rates with respect to the fluid moving through said passages.

7. A boiler structure as set forth in claim 3 wherein said fin plate is in the form of louvers punched out of said plate which provide channels for the fluid flowing through said passageways with said louvers providing contacts that engage said screen members and force same against the plate members.

* * * * *